(12) United States Patent
Oishi

(10) Patent No.: US 7,835,462 B2
(45) Date of Patent: Nov. 16, 2010

(54) CORRECTION CIRCUIT

(75) Inventor: Kazuaki Oishi, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 968 days.

(21) Appl. No.: 11/505,827

(22) Filed: Aug. 18, 2006

(65) Prior Publication Data
US 2007/0153940 A1 Jul. 5, 2007

(30) Foreign Application Priority Data
Jan. 4, 2006 (JP) ............ 2006-000264

(51) Int. Cl.
*H04L 27/00* (2006.01)
*H03K 9/00* (2006.01)
(52) U.S. Cl. ............ 375/316; 375/327; 375/374; 375/375; 375/376
(58) Field of Classification Search .......... 375/316, 375/327, 374, 375
See application file for complete search history.

(56) References Cited

U.S. PATENT DOCUMENTS

| 6,438,184 B1 * | 8/2002 | Nayler ............ 375/345 |
| 7,106,140 B2 * | 9/2006 | Mone ............ 331/16 |
| 7,116,948 B2 * | 10/2006 | Chien ............ 455/115.3 |

FOREIGN PATENT DOCUMENTS

JP    2001-211214 A    8/2001

\* cited by examiner

*Primary Examiner*—Ted M Wang
(74) *Attorney, Agent, or Firm*—Arent Fox LLP

(57) ABSTRACT

A comparator compares the voltage of an envelope signal by applying envelope detection to a signal amplitude-modulated by a digital signal encoded by a Manchester code with the terminal voltage of a capacitor constituting a filter for converting the output current of a charge pump into a voltage. The charge pump charges/discharges the capacitor by discharging or charging current, according to the result of the comparison.

9 Claims, 20 Drawing Sheets

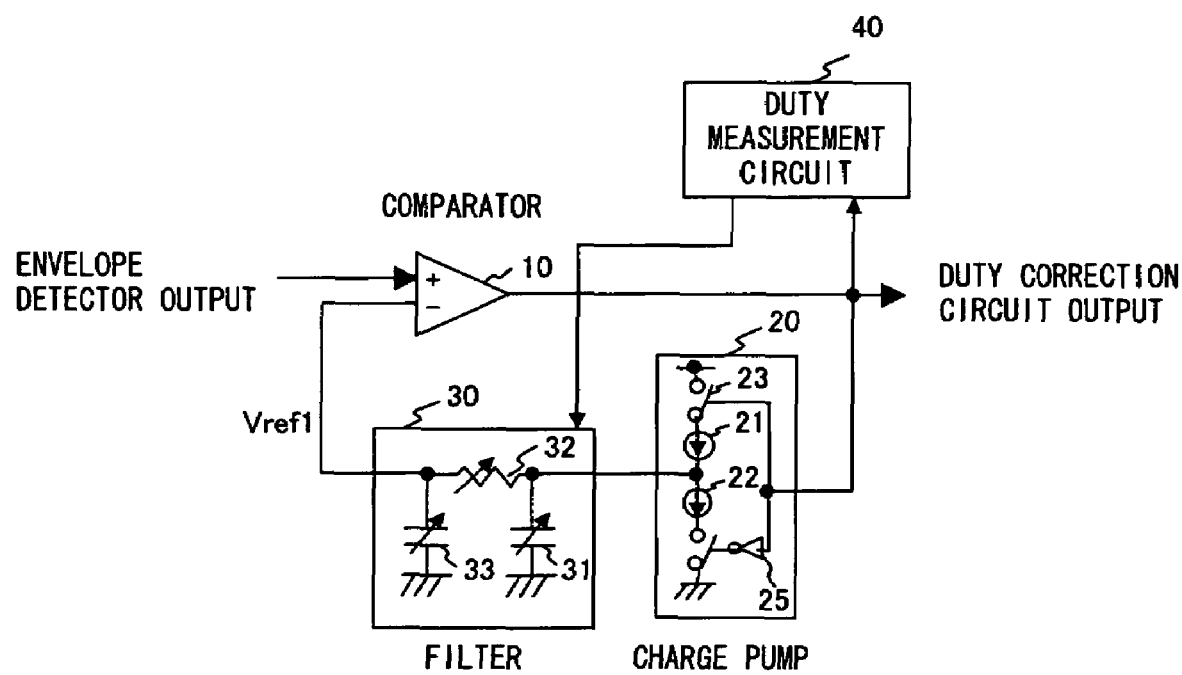
F I G. 1 3

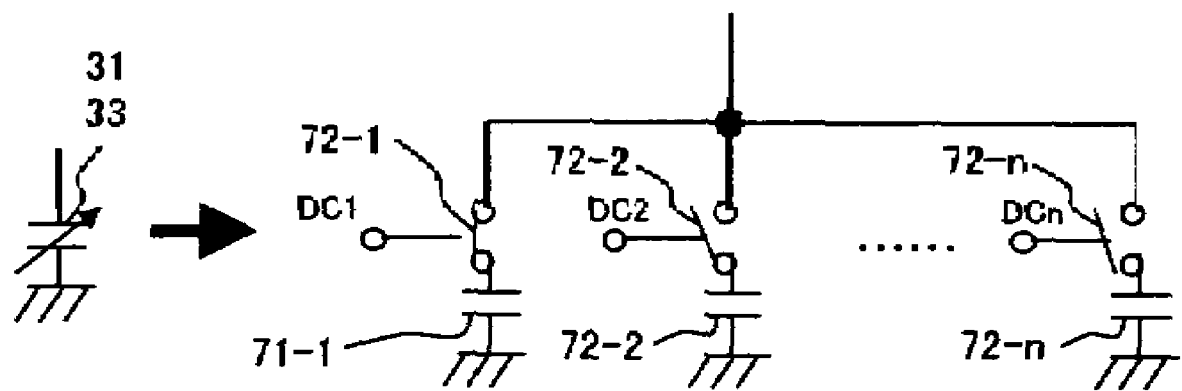
F I G. 1 4 A

CORRECTION CIRCUIT

CROSS REFERENCE TO RELATED APPLICATIONS

This application is based upon and claims the benefit of priority from the prior Japanese Patent Application No. 2006-000264, filed Jan. 4, 2006, the entire contents of which are incorporated by reference.

BACKGROUND OF THE INVENTION

1. Field of the Invention

The present invention relates to the transmission technology of digital information, and more particularly relates to a technology suited for an amplitude shift keying (ASK) receiver for demodulating a signal modulated by an ASK method, using a digital signal which is encoded by a Manchester code, into its original signal.

2. Description of the Related Art

The principle of a general ASK receiver is described with reference to FIGS. 1 and 2. FIG. 1 shows the general configuration an ASK receiver. FIG. 2 shows an example of the operational waveform of each unit of the ASK receiver shown in FIG. 1.

A radio frequency (RF)-band or intermediate frequency (IF)-band signal (signal (A) in FIG. 2) is inputted to a logarithmic amplifier 101. This signal is obtained by applying amplitude modulation to a carrier wave by a digital signal encoded by a Manchester code. The logarithmic amplifier 101 logarithmically amplifies this inputted signal.

An envelope detector 102 applies envelope detection to the signal outputted from the logarithmic amplifier 101 and outputs the envelope of the signal (signal (B) in FIG. 2).

A duty correction circuit 103 reproduces its original digital signal (signal (C) in FIG. 2) from the envelope outputted from the envelope detector 102.

A demodulator 104 decodes the digital signal encoded by a Manchester code into its original digital data (data (D) in FIG. 2).

Here, the Manchester code is described.

When original data is "1", the Manchester code encodes the former half and latter half of one prescribed cycle (Ts) into "0" and "1", respectively. If the original data is "0", the Manchester code encodes the former half and latter half of one prescribed cycle (Ts) into "1" and"0", respectively. However, the Manchester code can also encode the former half and latter half of one prescribed cycle (Ts) into "1" and "0", respectively. If the original data is "0", the Manchester code can also encode the former half and latter half of one prescribed cycle (Ts) into "1" and "0", respectively. In either case, the ideal ratio between a period during which "1" is outputted and a period during which "0" is outputted of the digital signal encoded by the Manchester code is 50:50.

Next, the duty correction circuit 103 shown in FIG. 1 is further described.

As described above, the duty correction circuit 103 reproduces a digital signal encoded by a Manchester code by the output of the envelope detector 102. It is ideal for the output of the duty correction circuit 103 to switch from "0" (low level) to "1" (high level) or from "1" (high level) to "0" (low level) at just the half time of one cycle (Ts). In this case, if the ratio between the time of "1" and time of "0" in one cycle (Ts) (duty ratio) somewhat deviates from the ideal 50:50, the demodulator 104 cannot determine its original data to fail to decode the digital signal. Therefore, it is necessary for the duty correction circuit 103 to prevent the duty ratio of a digital signal to reproduce from deviating from 50:50 (50%) as much as possible.

Here, FIG. 3 is described. FIG. 3 shows an example of a general circuit configuration of the duty correction circuit 103.

The circuit shown in FIG. 3 comprises a fairly higher-order filter (low-pass filter or band-pass filter) 111, a low-pass filter (LPF) composed of a resistor 112 and a capacitor 113, for extracting a low frequency component from the output of this filter 111 and a comparator 114 to the positive and negative input terminals of which the output of the filter 111 and the output of the LPF, respectively, are inputted.

The comparator 114 compares the voltage of a signal outputted from the filter 111 with the average voltage of the signal, obtained by the LPF and outputs this comparison result. In this case, if the duty ratio of the signal outputted from the filter 111 is 50%, the average voltage of the signal is located at just the center of the amplitude width of the signal. Therefore, by the comparator 114 determining the height of the voltage of the signal using this average voltage as its threshold, the original digital signal encoded by a Manchester code is reproduced.

Japanese Patent Application No. 2001-211214 discloses the circuit shown in FIG. 4 as the duty correction circuit 103. This circuit comprises a comparator 121 and an integrator 122.

The integrator 122 comprises a resistor 123, a capacitor 124 and an operational amplifier 125. In this case, the capacitor 124 is inserted between the inversion input terminal and output terminal of the operational amplifier 125, and one terminal of the resistor 123 is connected to the inversion input terminal of the operational amplifier 125. To the other terminal of this resistor 123, the voltage of a signal inputted to the integrator 122 is applied. To the non-inversion input terminal of the operational amplifier 125, reference voltage Vref2 (for example, voltage of approximately a half of the power voltage) is applied.

Voltage Vref1 outputted by the operational amplifier 125 is the output of the integrator 122. This voltage Vref1 is inputted to one comparison terminal (positive input terminal) of the comparator 121. To the input terminal of the integrator 122, the output signal of the comparator 121, that is, the original digital signal encoded by a Manchester code, which is the output of the circuit shown in FIG. 4, is inputted.

An envelope signal outputted by the envelope detector 102 is inputted to the other comparator terminal (negative input terminal) of the comparator 121.

In the circuit shown in FIG. 4, if the duty ratio of the digital signal that is encoded by a Manchester code and is outputted by the comparator 121 deviates from 50%, the output voltage Vref1 of the integrator 122 changes in such a way as to bring this duty ratio close to 50%. Thus, the duty ratio of the output signal of the circuit shown in FIG. 4 is improved regardless of the waveform of the envelope signal outputted by the envelope detector 102.

In order to the circuit shown in FIG. 3 to operate well, it is preferable for the duty ratio of the signal outputted from the filter 111 to be close to 50%. For that purpose, the filter 111 must be higher-order. However, in order to build a higher-order filter, a lot of parts are needed to lead to cost-up and also make its integration difficult.

However, the circuit shown in FIG. 4 requires no higher-order filter. However, if the data rate of the original digital data is high (one cycle (Ts) is short), in order to reproduce the digital signal by this circuit, a higher-speed operational amplifier 125 is also needed to increase current consumption.

Furthermore, if the reference voltage Vref2 of the integrator 122 deviates from a prescribed voltage, the duty ratio deviates. If the envelope signal inputted to the circuit shown in FIG. 4 rapidly changes, it takes much time in connection with the time constant of the integrator 122 to obtain the stable duty ratio of the digital signal. Therefore, if the time constant of the integrator 122 is increased to stabilize the duty ratio of the digital signal to reproduce, the responsiveness on the rapid change of an input signal degrades.

SUMMARY OF THE INVENTION

It is an object of the present invention to provide a duty correction circuit whose current consumption is low, whose responsiveness on an input signal is good and which can obtain the stable duty ratio of a digital signal without using high-order filter.

The correction circuit in one aspect of the present invention comprises a comparator for comparing a voltage of an envelope signal obtained by applying envelope detection to a signal whose amplitude is modulated by a digital signal which is encoded by a Manchester code with a terminal voltage of a capacitor and a charge pump for charging/discharging the capacitor by discharging or charging current, according to the comparison result.

According to this configuration, since the charge pump charge/discharge the capacitor whose terminal voltage is compared with the voltage of envelope signal, according to the comparison, a stable duty ratio whose responsiveness on an input signal is good and whose current consumption is small compared with a high speed operational amplifier can be obtained.

The above-described correction circuit of the present invention can also further comprise a filter, which is comprised of the capacitor, for converting an output current of the charge pump into a voltage.

In this case, the filter can also comprise a first capacitor inserted between an output of the charge pump and a constant voltage source or ground, a resistor one terminal of which is connected to the output of the charge pump, a second capacitor inserted between the other terminal of the resistor and the constant voltage source or the ground, and the comparator can also compares the voltage of the envelop signal with a thermal voltage of the second capacitor.

According to this configuration, stability and responsiveness can be well balanced.

Alternatively, the capacitor can also be inserted between an output of the charge pump and a constant voltage source or ground.

According to this configuration, the filter can comprise fewer devices.

The above-described correction circuit of the present invention can also comprise a duty measurement unit for measuring a duty of a signal outputted from the comparator and a charge/discharge control unit for controlling time constant needed for the charge pump to charge/discharge the capacitor, according to the measurement result of the duty.

According to this configuration, the responsiveness of the circuit in the case where the duty ratio of the signal outputted from the comparator deviates from the proper range can be improved and also the stability of the circuit in the case where the duty ration returns to the proper range can be maintained.

In this case, the charge/discharge control unit can also control the time constant by changing an amount of current discharged or charged by the charge pump.

Alternatively, the charge/discharge control unit can also control the time constant by changing a capacity of the capacitor.

According to either of the configurations, the time constant needed for the charge pump to charge/discharge the capacitor can be changed.

In this case, the duty measurement unit can also measure a continuation time of a high-level signal and a continuation time of a low-level signal outputted from the comparator, and the charge/discharge control unit can also perform the control when at least one of the continuation times changes beyond a prescribed time.

Alternatively, the duty measurement unit can also measure a difference in a continuation time between a high-level signal and a low-level signal outputted from the comparator, and the charge/discharge control unit can also perform the control when the difference in the continuation time changes beyond a prescribed time.

According to either of the configurations, the time constant needed to for the charge pump to charge/discharge the capacitor can be changed.

In this case, when controlling the time constant in such a way as to extend it, the charge/discharge control unit can also control the time constant slower than when controlling the time constant in such a way as to shorten it.

According to this configuration, the stability of the circuit immediately after restoring the time constant needed to charge/discharge the capacitor to the normal state can be improved.

According to the present invention, thus, a duty correction circuit whose current consumption is low, whose responsiveness on an input signal is good and which can obtain the stable duty ratio of a digital signal without using high-order filter can be obtained.

BRIEF DESCRIPTION OF THE DRAWINGS

The present invention will be more apparent from the following detailed description when the accompanying drawings are referenced, in which:

FIG. 13 shows the third example of the duty correction circuit of the present invention;

FIG. 14A shows an example of the capacitor circuit capable of switching the capacity by a switch-over signal outputted from the duty measurement circuit.

DESCRIPTION OF THE PREFERRED EMBODIMENTS

The preferred embodiments of the present invention are described below with reference to the drawings.

Figure 5:
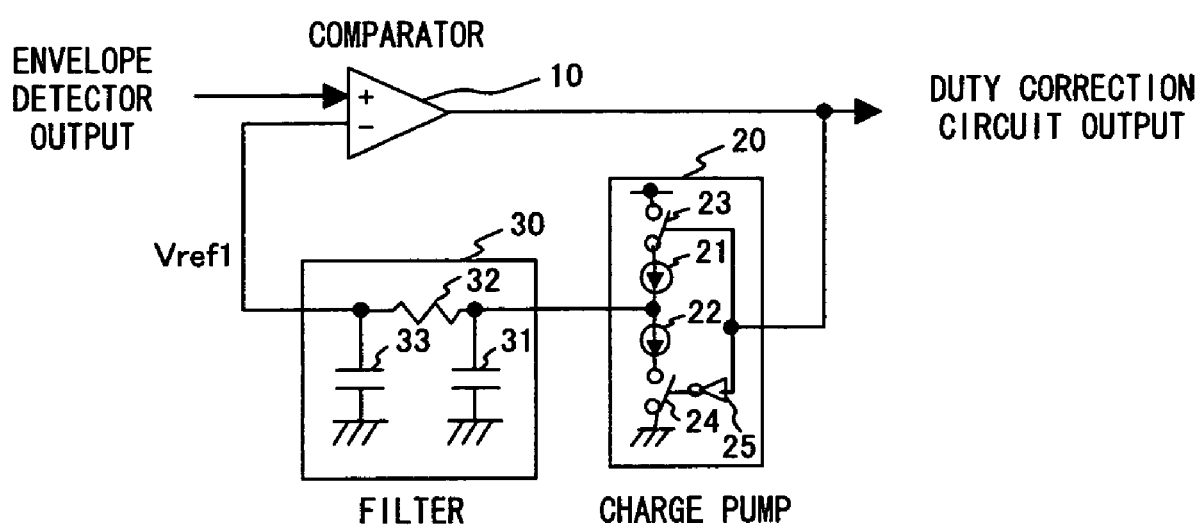
FIG. 5 shows the first example of the duty correction circuit of the present invention.

Firstly, FIG. 5 is described. FIG. 5 shows the first example of the duty correction circuit of the present invention. The circuit shown in FIG. 5 comprises a comparator 10, a charge pump 20 and a filter 30.

The output of the envelope detector 102, specifically an envelope signal obtained by applying envelope detection to a signal amplitude-modulated by a digital signal encoded by a Manchester code is inputted to the positive input terminal of the comparator 10. To the negative input terminal (comparison terminal) of the comparator 10, voltage Vreff1 outputted from the filter 30 is applied. The comparator 10 compares this voltage of the envelope signal with the voltage Vref1. If the envelope signal voltage is larger than Vref1, a high level signal (hereinafter called an "H signal") is outputted. If the envelope signal voltage is smaller than Vref1, a low level signal (hereinafter called an "L signal") is outputted. This signal outputted from the comparator 10 is the output signal of the circuit shown in FIG. 5.

The charge pump 20 comprises a current power supplies 21 and 22, switches 23 and 24 and an inverter 25.

The current source 21 and the switch 23 are connected in series and are inserted between the power line of the circuit shown in FIG. 5 and the output of the charge pump 20. The switch 23 opens and closes according to the output of the comparator 10. Specifically, if the comparator 10 outputs an H signal, the switch 23 is short-circuited. Therefore, constant current flown in from the current source 21 is discharged from the output terminal of the charge pump 20 only at this time.

However, the current source 22 and the switch 24 are connected in series and are inserted between the output of the charge pump 20 and ground (reference potential) of the circuit shown in FIG. 5. The switch 24 opens and closes according to the output of the comparator 10. However, since the output of the comparator 10 is led to the switch 24 via the inverter 25, the switch 24 is short-circuited when the comparator 10 outputs an L signal. The constant current flown by the current source 22 is sucked in from the output of the charge pump only at this time.

Therefore, when the comparator outputs an H signal, the charge pump 20 discharges current. When the comparator outputs an L signal, the charge pump 20 charges current. That is, according to the comparison result of the comparator 10, if the envelope signal voltage is larger than Vref1, the charge pump 20 discharges current, and if the envelope signal voltage is smaller than Vref1, the charge pump 20 sucks in current.

The filter 30 comprises a capacitor 31, a resistor 32 and a capacitor 33. The capacitor 31 is inserted between the output of the charge pump 20 and the ground. One terminal of the resistor 32 is connected to the output of the charge pump 20. The capacitor 33 is inserted between the other terminal of the resister 32 and the ground. Therefore, if the charge pump 20 discharges current, the capacitors 31 and 33 are charged. If the charge pump 20 sucks in current, the capacitors 31 and 33 are discharged.

The output of the filter 30 is led from the joint node of the resistor 32 and the capacitor 33. Therefore, voltage Vref1 applied to the negative input terminal of the comparator 10 corresponds to the terminal voltage of the capacitor 33. In other words, the filter 30 converts the output current of the charge pump 20 into voltage.

Figure 6:
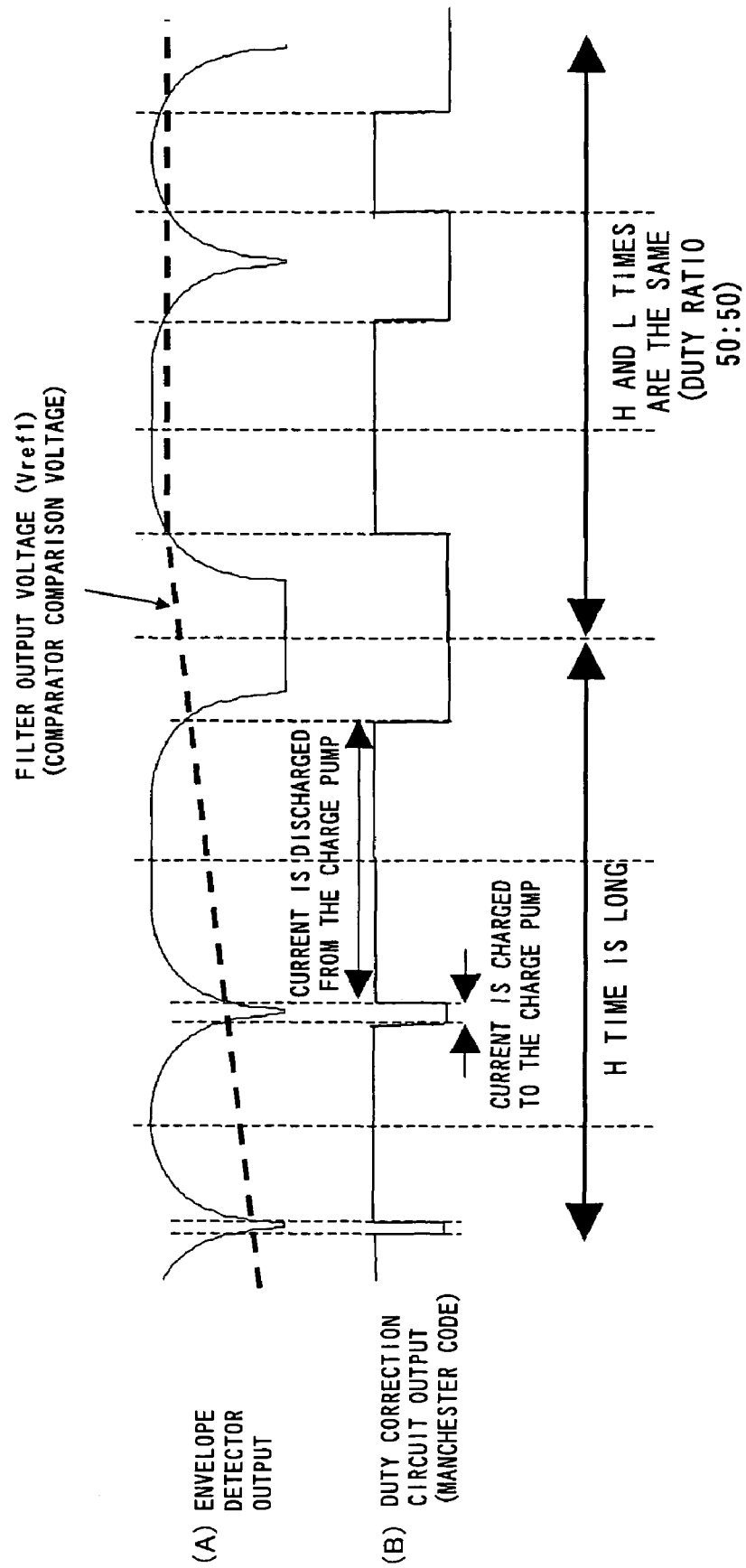
FIG. 6 shows an example of the operational waveform of each unit of the duty correction circuit shown in FIG. 5.

The operation of the circuit shown in FIG. 5 is described with reference to FIG. 6. FIG. 6 shows an example of the operational waveform of each unit of the circuit shown in FIG. 5.

As described above, if the voltage of the envelope signal (waveform (A) in FIG. 6), which is an input signal, is higher than the output voltage Vref1 of the filter 30 (broken line waveform in FIG. 6), the comparator 10 outputs an H signal. If the voltage of the envelope signal is lower than the output voltage Vref1, it outputs an L signal (see waveform (B) in FIG. 6). Therefore, if the voltage Vref1 is high, the comparator 10 outputs an L signal for a longer time than an H signal. If the voltage Vref1 is low, the comparator 10 outputs an H signal for a longer time than an L signal.

Firstly, the operation in the case where the output voltage Vref1 of the filter 30 is low and the comparator 10 outputs an H signal for a longer time than an L signal is described. In this case, since the charge pump 20 discharges current for a longer time than when charging it, the capacitors 31 and 33 of the filter 30 is charged, and as a result, the output voltage Vref1 of the filter 30 increases. When this voltage Vref1 increases, as described above, the comparator 10 changes the operational state in such a way as to extend the output time of the L signal (period on the left side in FIG. 6).

Then, the period during which the comparator 10 outputs the L signal and the period during which the comparator 10 outputs an H signal become equal and the duty ratio of a digital signal outputted from the circuit shown in FIG. 5 becomes 50:50 (50%). At this time, the period during which the charge pumps 20 discharges current and the period during which it sucks in current become equal. Therefore, the charged amount of electric charge and its discharged amount become equal. Therefore, the average output voltage Vref1 of the filter 30 becomes constant and the circuit enters the normal state (period on the right side in FIG. 6).

Next, the operation in the case where the output voltage Vref1 of the filter 30 is high and the comparator 10 outputs the L signal for a longer time than an H signal is described. In this case, since the charge pump 20 sucks in current for a longer time than when discharging it, electric charge is discharge from the filter 30. As a result, the voltage Vref1 decreases. When the voltage Vref1 decreases, the comparator 10 outputs an H signal for a longer time than the L signal. Before long, the duty ratio of the digital signal outputted from the circuit shown in FIG. 5 converges on 50%.

Figure 4:
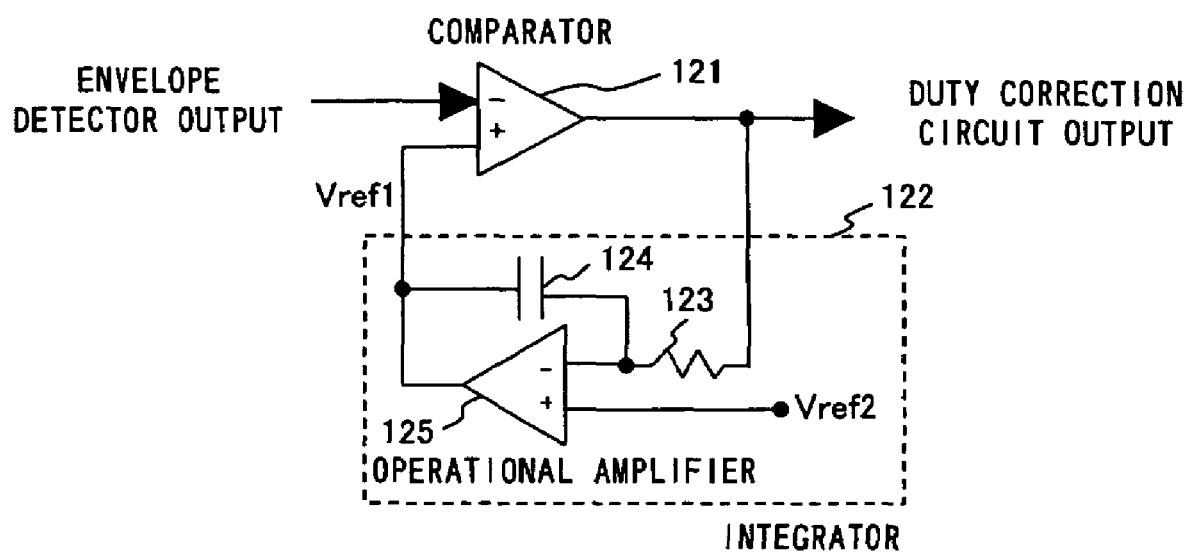
FIG. 4 shows the circuit configuration of the duty correction circuit disclosed by Japanese Patent Application No. 2001-211214.

In this case, as described above, since the charge pump 20 comprises current power supplies 21 and 22, switches 23 and 24 and an inverter 25, the operation speed is high. Therefore, if the circuit shown in FIG. 5 reproduces the original digital signal even when the data rate of the original digital signal is high (one cycle (TS) is short), current consumption can be reduced compared with the circuit using the operational amplifier 125, as shown in FIG. 4.

Figure 7A:
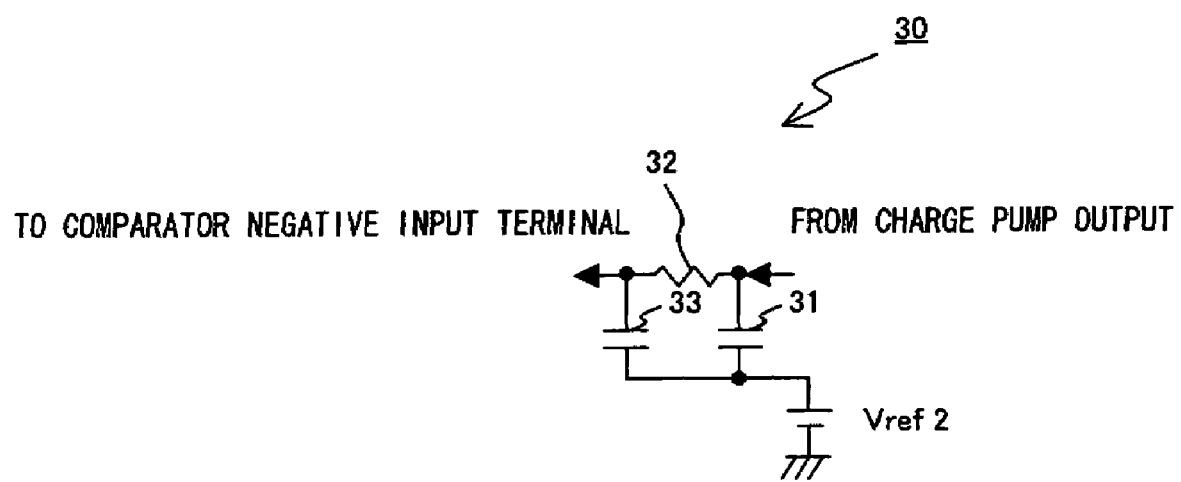
FIG. 7A shows the first example of the detailed configuration of the filter in the duty correction circuit shown in FIG. 5.
Figure 7B:
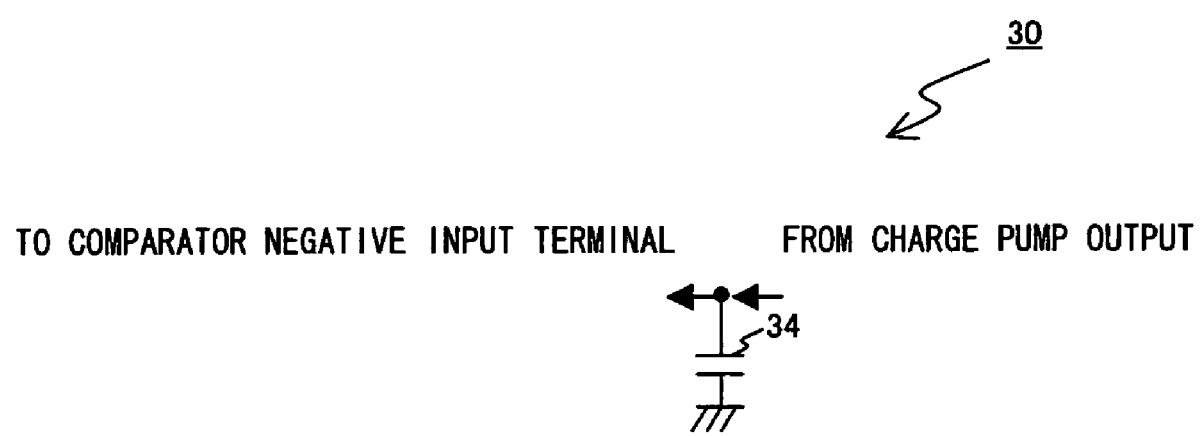
FIG. 7B shows the second example of the detailed configuration of the filter in the duty correction circuit shown in FIG. 5.
Figure 7C:
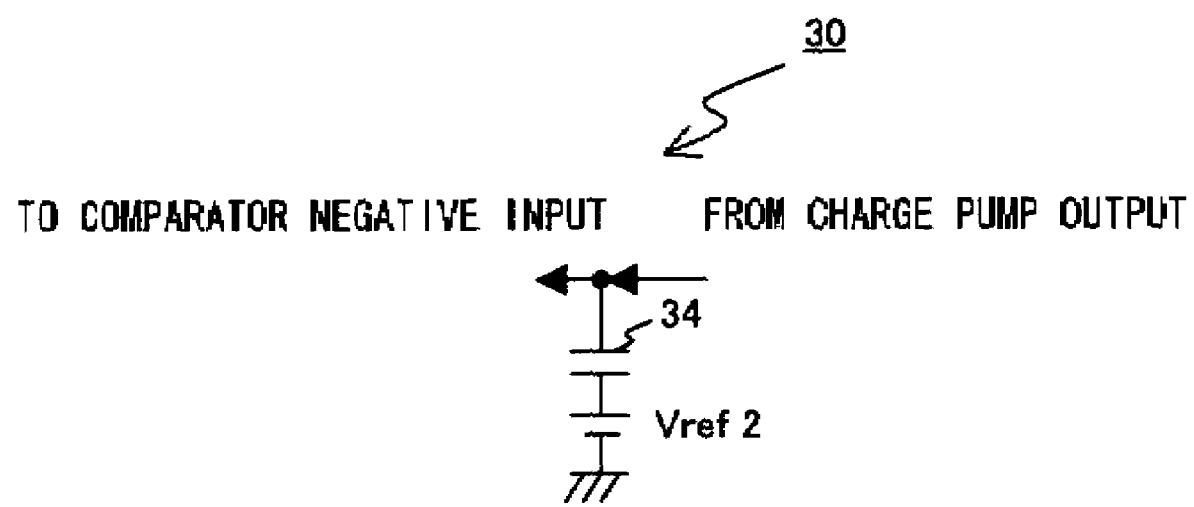
FIG. 7C shows the third example of the detailed configuration of the filter in the duty correction circuit shown in FIG. 5.

In the circuit shown in FIG. 5, for the circuit configuration of the filter 30, one shown in FIG. 7A, 7B or 7C can also be used instead of one shown in FIG. 5. In any of the configurations, since the same operation as the circuit shown in FIG. 5 is performed, the duty ratio of the outputted digital signal can be made 50%.

In the filter 30 shown in FIG. 7A, one terminal of each of the capacitors 31 and 33 connected to the ground in the circuit shown in FIG. 5 is connected to a constant voltage source for outputting a prescribed voltage Vref2.

In the filter 30 shown in FIG. 7B, a capacitor 34 is inserted between the output of the charge pump 20 and the ground, and the output of the filter 30 is led from the joint node of the output of the charge pump 20 and the capacitor 33. In other words, the voltage Vref1 applied to the negative input terminal of the comparator 10 corresponds to the terminal voltage of the capacitor 34, and this capacitor 34 converts the output current of the charge pump 20 into voltage. If this circuit configuration is adopted (the filter 30 shown in FIG. 5 is replaced with that shown in FIG. 7B), the first-order feedback system is formed. Therefore, although it is inferior to the circuit shown in FIG. 5, forming the second-order feedback system (circuit in which the filter 30 comprises the capacitors 31 and 33 and the resistor 32) in the balance between stability and responsiveness, it can be configured with fewer devices.

The filter 30 shown in FIG. 7C can be obtained by connecting one terminal of the capacitor 34 connected to the ground in the circuit shown in FIG. 7B to a constant voltage source for outputting the prescribed voltage Vref2.

Next, another preferred embodiment of the present invention is described.

In the ASK receiver, the amplitude of an RF-band or IF-band signal to receive decreases and increases due to various causes. (A) of FIG. 8 shows an example of the waveform of the signal whose amplitude increases.

Figure 1:
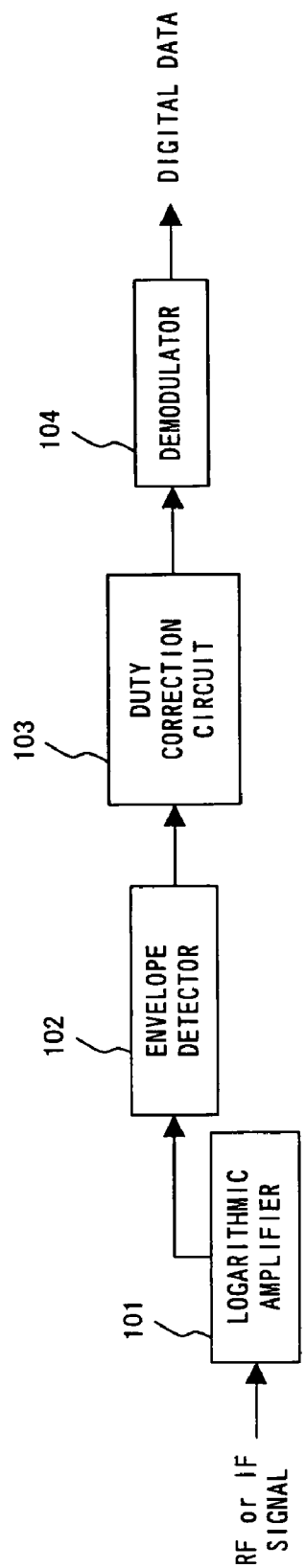
FIG. 1 shows the general configuration of the ASK receiver.
Figure 2:
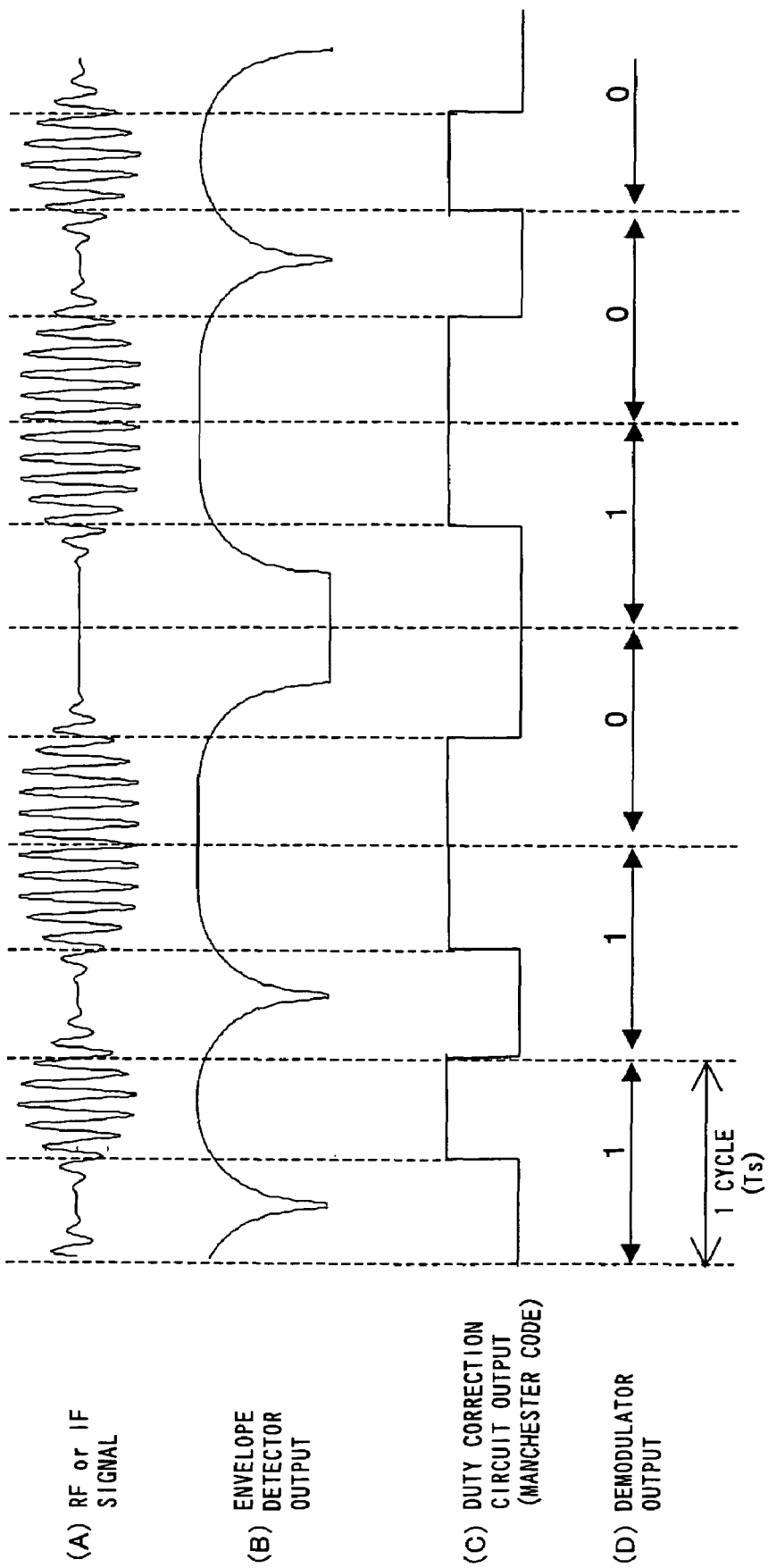
FIG. 2 shows an example of the operational waveform of each unit of the ASK receiver shown in FIG. 1.
Figure 3:
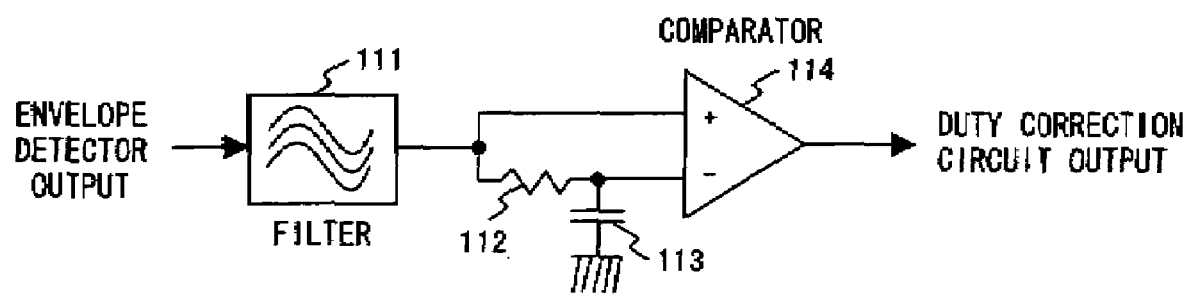
FIG. 3 shows an example of the general circuit configuration of the duty correction circuit.
Figure 8:
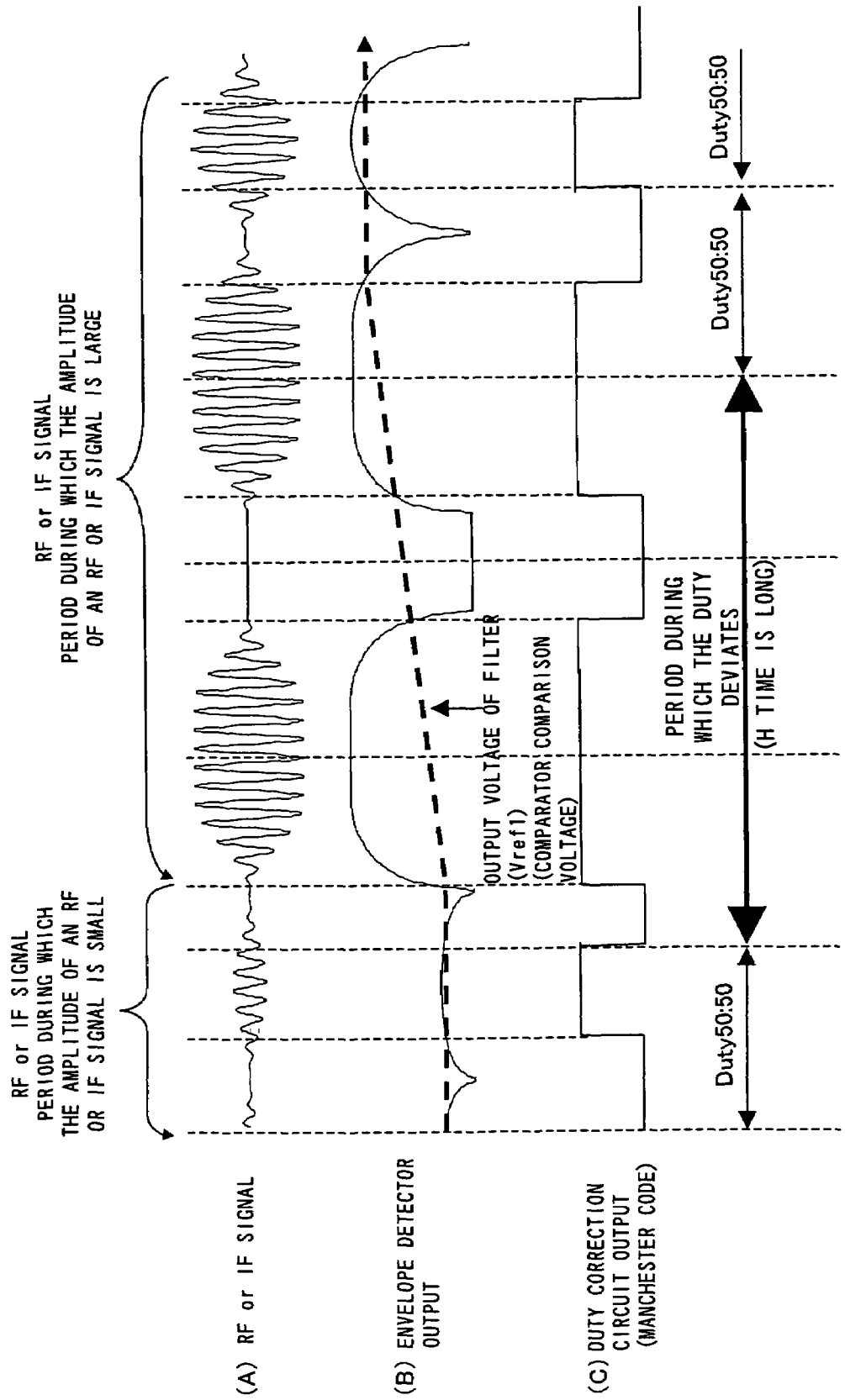
FIG. 8 shows the operational waveform of each unit of the duty correction circuit shown in FIG. 1 in the case where the amplitude of an input signal rapidly changes.

When the amplitude of the signal increases like this, the voltage of a signal outputted by the envelope detector 102 of the ASK receiver shown in FIG. 1 also increase as shown in (B) of FIG. 8.

If the voltage of the output signal of the envelope detector 102 increases as described above when the duty correction circuit 103 of the ASK receiver shown in FIG. 1 is configured as shown in FIG. 5, the output voltage Vref1 of the filter (broken line in FIG. 8) decreases below the normal state at the time of the large amplitude of the signal. Then, the comparator 10 outputs an H signal for a longer time than the L signal, and the duty ratio of the outputted digital signal temporarily deviates from 50:50 (50%). However, then, in the circuit shown in FIG. 5, as described above, the voltage Vref1 increases to converge the duty ratio of the outputted digital signal on 50% (see the waveform shown in (C) of FIG. 8).

Since the duty ratio of the digital signal outputted from the circuit shown in FIG. 5 greatly deviates from 50% immediately after the amplitude of RF- or IF-band signal increases in this series of operations as described above, then the demodulator 104 cannot decode the signal encoded by a Manchester code. Therefore, it is preferable to shorten the time the duty ratio of this digital signal deviates from 50% as much as possible.

However, the time the duty ratio of this digital signal outputted from the circuit shown in FIG. 5 deviates from 50% relates to a time the charge pump 20 charges or discharges charge accumulated in the filter 30. Thus, by increasing current charged or discharged by the charge pump 20 or shortening the time constant of the filter, the time the duty ratio of the outputted digital signal deviates from 50% can be reduced. However, setting the current high or setting the time constant of the filter 30 incurs the degradation of the operation stability in the vicinity of the normal state of the circuit shown in FIG. 5.

Figure 9:
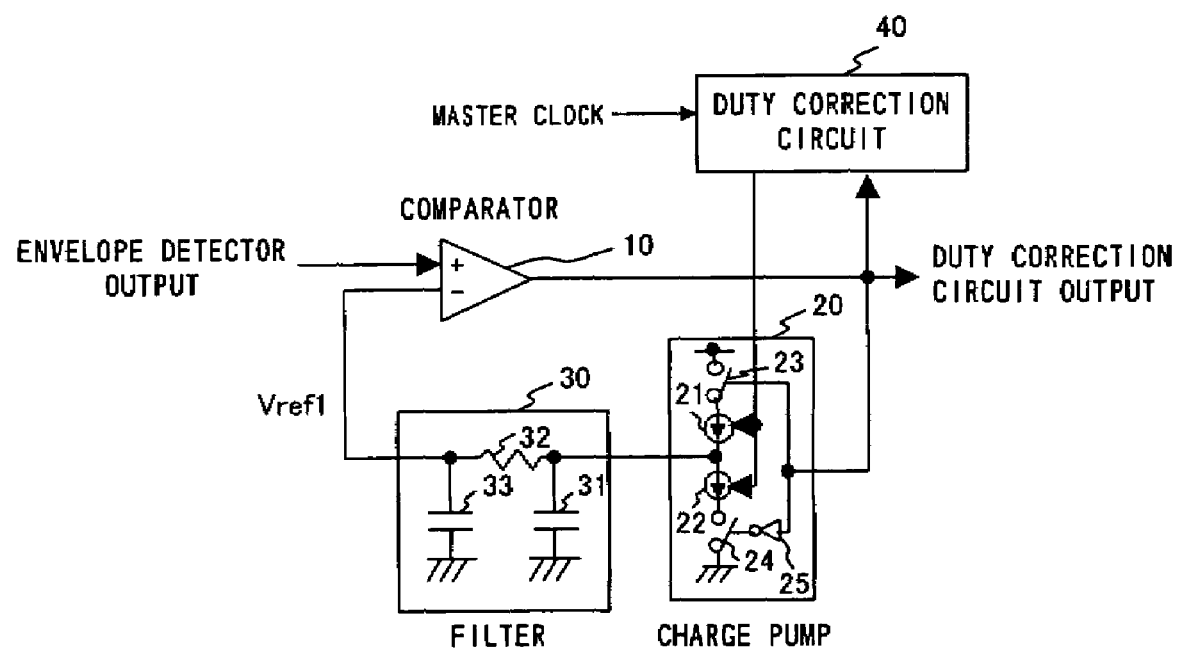
FIG. 9 shows the second example of the duty correction circuit of the present invention.

Next, FIG. 9 is described. FIG. 9 shows the second example of the duty correction circuit of the present invention.

The second example shown in FIG. 9 further comprises a duty measurement circuit 40 in addition to the comparator 10, charge pump 20 and filter 30 which compose the first example shown in FIG. 5.

The duty measurement circuit 40 measures the duty of a signal outputted from the comparator 10, that is, a digital signal outputted from the duty correction circuit. Then, the measurement circuit 40 controls the amount of current discharged or charged by the charge pump 20 according to this measurement result to change time constant needed to charge or discharge the capacitors 31 and 33 of the filter 30. More specifically, if the duty ratio of the signal outputted from the comparator 10 deviates from 50% beyond the prescribed ratio, the measurement circuit 40 increases the output current of the charge pump 20 to speed up the charge or discharge of the capacitors 31 and 33 of the filter 30. Then, when the circuit shown in FIG. 9 approaches the normal state and the duty ratio of the signal outputted from the comparator 10 is improved up to within the prescribed ratio, it reduces the output current of the charge pump 20 to the normal level to secure the stability of the circuit shown in FIG. 9 in the normal state.

Figure 10A:
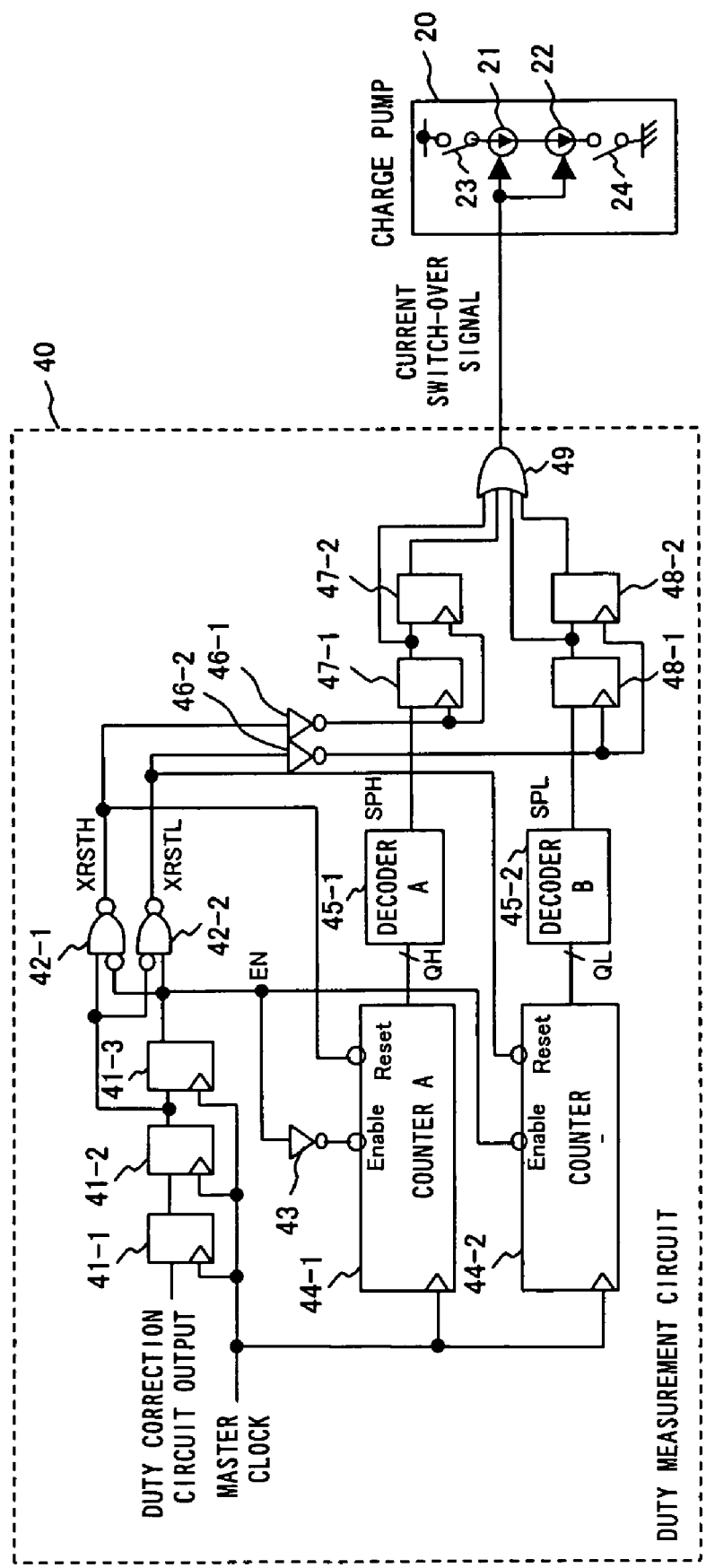
FIG. 10A shows the first example of the detailed circuit configuration of the duty correction circuit.
Figure 10B:
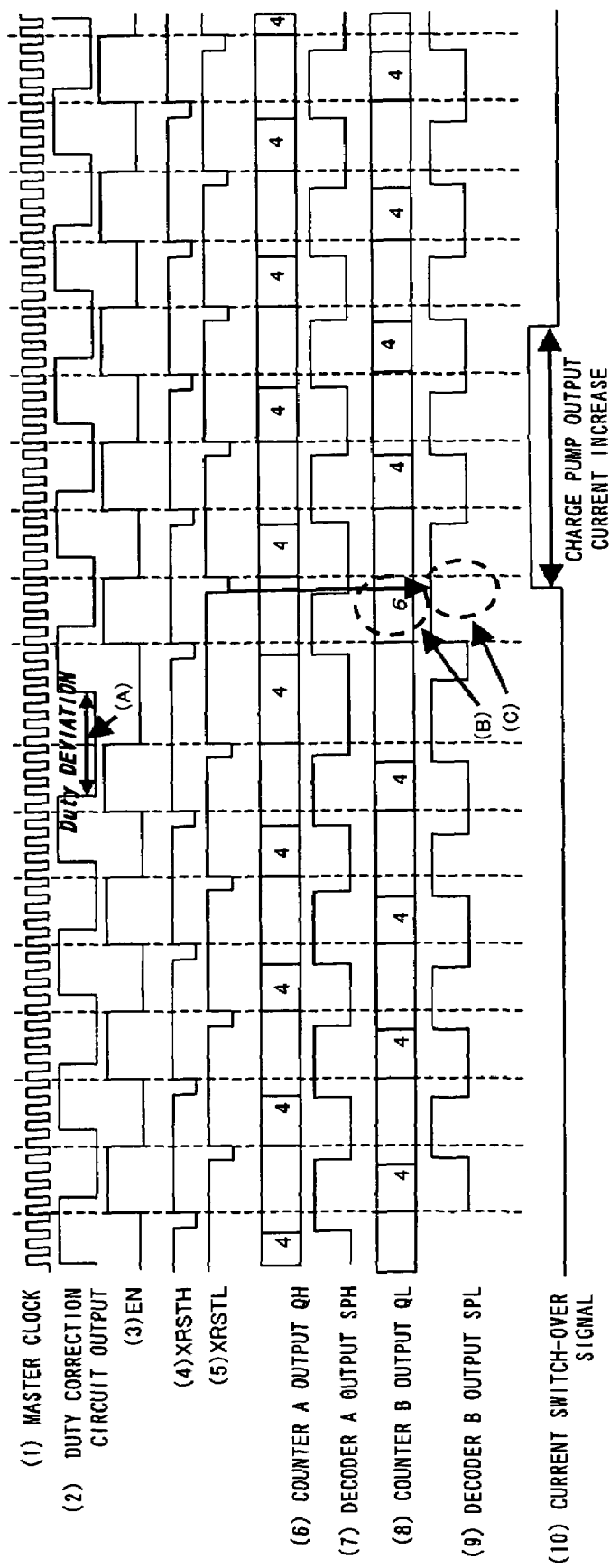
FIG. 10B shows the signal waveform of each unit of the circuit shown in FIG. 10A.

Next, FIGS. 10A and 10B are described. FIG. 10A shows the first example of the detailed circuit configuration of the duty correction circuit 40. FIG. 10B shows the signal waveform of each unit of the circuit shown in FIG. 10A.

The duty measurement circuit 40 shown in FIG. 10A comprises D flip-flops 41-1, 41-2 and 41-3, NAND circuits 42-1 and 42-2, an inverter 43, a counter A 44-1, a counter B 44-2, a decoder A 45-1, a decoder B 45-2, inverters 46-1 and 46-2, D flip-flops 47-1, 47-2, 48-1 and 48-2 and an OR circuit 49. In this case, a master clock (clock of a specific cycle which is shorter than that of a digital signal outputted from the duty correction circuit) which is supplied to the duty measurement circuit 40 is inputted to the clock terminals of the D flip-flops 41-1, 41-2 and 41-3 and the clock terminals of the counter A 44-1 and the counter B 44-2.

A digital signal outputted from the duty correction circuit is inputted to the input terminal of the D flip-flop 41-1. The output of the D flip-flop 41-1 is inputted to the input terminal of the D flip-flop 41-2, and the output of the D flip-flop 41-2 is inputted to the input terminal of the D flip-flop 41-3. Therefore, a signal EN, which is the output signal of the D flip-flop 41-3 delays from the digital signal outputted from the duty correction circuit by the three clocks of the master clock (see (1), (2) and (3) of FIG. 10B).

Each of the NAND circuits 42-1 and 42-2 has two inputs, and one of the two inputs is inversion input.

To the input terminals on the non-inversion side and the inversion side of the NAND circuit 42-1, the output of the D flip-flop 41-2 and the output of the D flip-flop 41-3, respectively, are inputted. Therefore, as shown in (4) of FIG. 10B, a signal XRSTH, which is the output signal of the NAND circuit 42-1 outputs the L signal during one clock time of a master clock immediately before the rising edge of the signal EN and an H signal during the other period.

However, to the input terminals on the non-inversion side and the inversion side of the NAND circuit 42-2, the output of the D flip-flop 41-3 and the output of the D flip-flop 41-2, respectively, are inputted. Therefore, as shown in (5) of FIG. 10B, a signal XRSTL, which is the output signal of the NAND circuit 42-2 outputs the L signal during one clock time of a master clock immediately before the falling edge of the signal EN and an H signal during the other period.

Each of the counter A 44-1 and counter B 44-2 counts the number of rising edges of a signal inputted to the clock terminal (that is master clock) while the L signal is inputted to the enable terminal. However, when the L signal is inputted to the reset terminal, the count value is reset (the count value is made "0").

To the enable terminal of the counter A 44-1, the signal EN is inputted via the inverter 43. To the reset terminal of the counter A 44-1, the signal XRSTH is inputted. Thus, the counter A 44-1 counts the number of the rising edges of the master clock while the signal EN continues to output an H signal.

To the enable and reset terminals of the counter B 44-2, the signals EN and XRSTL, respectively, inputted. Thus, the counter B 44-2 counts the number of the rising edges of the master clock while the signal EN continues to output an L signal.

Each of the decoder A 45-1 and decoder B 45-2 outputs the L signal when the counter values QH and QL of the counter A 44-1 and counter B 44-2, respectively, are within a prescribed range, and outputs an H signal when they are out of the prescribed range.

In this preferred embodiment, the proper cycle of the digital signal (digital signal encoded by a Manchester code) outputted from the duty correction circuit is assumed to be eight cycles of the master clock. If the continuation time of each of the H and L signals of the digital signal is out of the range of four±two cycles of the master clock, the output current of the charge pump 20 is increased from the normal value. If it is within four±one cycles of the master clock, the output current of the charge pump 20 is restored to the normal value. This control condition is only one example, and another condition can also be adopted.

On the above-described condition, when each of the count values of the counter A 44-1 and the counter B 44-2 is "3", "4" or "5", the decoder A 45-1 and the decoder B 45-2, respectively, output an L signal. When it is the other, it outputs an H signal.

In FIG. 10B, (6) indicates the count value QH of the master clock of the counter A 44-1. In this case, the period during which the count value "4" is clearly indicated. In this case, although the rising edge of the master clock continues to be inputted, the count value QH does not exceed "4". This is because when the counter A 44-1 counts "4", the signal EN becomes an L signal and an H signal is inputted to the enable terminal.

In this case, as described above, when the counter value is "3", "4" or "5", the decoder A 45-1 outputs an L signal. Therefore, the output signal SPH of the decoder A 45-1, shown in (7) of FIG. 10B becomes an L signal during one clock time of the master clock, immediately before the count value QH become "4" (period during which the count value QH is "3") and while the count value QH is "4", and becomes an H signal for the other period.

(8) shown in FIG. 10B indicates the count value QL of the master clock of the counter B 44-2. In this case too, the period during which the count value is "4" is clearly indicated. As described above, when the count value of the counter B 44-2 is "3", "4" or "5", the decoder B 45-2 outputs an L signal. Therefore, the output signal SPL of the decoder B 45-2, shown in (9) of FIG. 10B becomes an L signal during one clock time of the master clock, immediately before the count value QL become "4" (period during which the count value QL is "3") and while the count value QL is "4", and becomes an H signal during the other period.

However, in (2) shown in FIG. 10B, the continuation time of an L signal of the digital signal outputted from the duty correction circuit increases in a period (A). During this period (A), the count value QL of the master clock by the counter B 44-2 becomes "6", as shown in (B) of FIG. 10B. At this time, the output signal SPL of the decoder B 45-2 continues to be an H signal while the count value QL is "6" and until the count value QL becomes "3" again after being reset, as shown by (C) of (9) in FIG. 10B.

To the clock terminals of the D flip-flops 47-1 and 47-2, the signal XRSTH is inputted via the inverter 46-1. To the clock terminals of the D flip-flops 48-1 and 48-2, the signal XRSTL is inputted via the inverter 46-2.

The output signal SPH of the decoder A 45-1 is inputted to the input terminal of the D flip-flop 47-1. The output of the D flip-flop 47-1 is inputted to the input terminal of the D flip-flop 47-2. The output signal SPL of the decoder B 45-2 is inputted to the input terminal of the D flip-flop 48-1. The output of the D flip-flop 48-1 is inputted to the input terminal of the D flip-flop 48-2.

The OR circuit 49 has four input terminals. To the input terminals, the outputs of the D flip-flops 47-1, 47-2, 48-1 and 48-2 are inputted respectively. The output of the OR circuit 49 is the output signal (current switch-over signal) of the duty measurement circuit 40 shown in FIG. 10A, and this output signal controls the amount of output current of the charge pump 20.

The D flip-flop 47-1 outputs a signal inputted to the input terminal when a signal inputted to the clock signal (signal obtained by inverting the signal XRSTH) rises up. Therefore, when the duty of the signal outputted from the duty correction circuit is proper, the D flip-flop 47-1 outputs an L signal. In this case, a time needed to convey the rising change of the signal XRSTH to the D flip-flop 47-1 via the inverter 46-1 is sufficiently shorter than a time the output signal SPH of the decoder 45-1 is transited from an L signal to an H signal by the signal XRSTH resetting the counter value. Therefore, although in FIG. 10B, the falling edge of the signal XRSTH shown in (4) and the rising edge of the signal SPH shown in (7) looks to occur at the same time, the output at this time of the D flip-flop 47-1 becomes an L signal.

As long as the D flip-flop 47-1 continues to output an L signal, the D flip-flop 47-2 also continues to output an L signal.

The D flip-flop 48-1 outputs a signal inputted to the input terminal when a signal inputted to the clock terminal (signal obtained by inverting the signal XRSTL) rises up. Therefore, when the duty of the signal outputted from the duty correction circuit is proper, the D flip-flop 48-1 outputs an L signal. In FIG. 10B, the output of the D flip-flop 48-1 in the part where the falling edge of the signal XRSTL shown in (5) and the rising edge of the signal SPL shown in (9) looks to occur at the same time becomes an L signal as in the D flip-flop 47-1.

As long as the D flip-flop 48-1 continues to output an L signal, the D flip-flop 48-2 also continues to output an L signal.

As described above, while the D flip-flops 47-1, 47-2, 48-1 and 48-2 all output an L signal, the OR circuit 49 outputs an L signal. While the OR circuit 49 outputs an L signal, the charge pump 20 maintains the amount of current of the current sources 21 and 22 at a normal level.

If during the period (C) shown in (9) of FIG. 10B, that is, while the output signal SPL of the decoder B 45-2 is an H signal in the falling edge of the signal XRSTL shown in (5), the D flip-flop 48-1 outputs an H signal. In this case, the OR circuit 49 outputs an H signal.

Although this D flip-flop 48-1 continues to output an H signal until the subsequent falling edge of the signal XRSTL is inputted, then the D flip-flop 48-2 outputs an H signal. This D flip-flop 48-2 continues to output an H signal until the subsequent falling edge of the signal XRSTL is inputted.

While any of the D flip-flops 47-1, 47-2, 48-1 and 48-2 outputs an H signal, the OR circuit 49 outputs an H signal. While the OR circuit 49 outputs an H signal, the charge pump 20 increases the amount of current of the current sources 21 and 22 beyond the normal level.

Thus, when the continuation time of an L signal in the digital signal outputted from the duty correction circuit increases out of the proper range, the output current of the charge pump 20 is increased to speed up the charge or discharge of the capacitors 31 and 33 of the filter 30.

In the above description, the continuation time of an L signal in the digital signal outputted from the duty correction circuit increases beyond the proper amount. However, if the continuation time of an L signal in the digital signal outputted from the duty correction circuit decreases below the proper amount too, the output signal SPL of the decoder B 45-2 becomes an H signal at the falling edge of the signal XRSTL and the OR circuit 49 outputs an H signal for a prescribed time. Therefore, the amount of output current of the charge pump 20 is controlled in such a way as to increase beyond the normal level.

If the continuation time of an H signal in the digital signal outputted from the duty correction circuit deviates from the proper amount, the output signal SPH of the decoder A 45-1 becomes an H signal at the falling edge of the signal XRSTH, and the OR circuit 49 outputs an H signal for a prescribed time. As a result, the amount of output current of the charge pump 20 is controlled in such a way as to increase beyond the normal level.

In FIG. 10A, the counter A 44-1 and counter B 44-2 count the number of the rising edges of the master clock during the continuation time of h and L signals in the digital signal outputted from the duty correction circuit. Alternatively, the circuit configuration shown in FIG. 10A can be modified to count the number of the falling edges of the master clock. Alternatively, the respective number of both the falling and rising edges of the master clock can be counted.

As described above, in the first example of the duty measurement circuit 40 described with reference to FIGS. 10A and 10B, the counter A 44-1 and the counter B 44-2 measure the respective continuation times of L and H signals in the output of the comparator 10 of the duty correction circuit shown in FIG. 9, using a master clock. Then, the decoder A 45-1 and the decoder B 45-2 detect whether at least one of the continuation times changes. If such a change is detected, a control signal generated by a circuit composed of the D flip-flops 47-1, 47-2, 48-1 and 48-2 and the OR circuit 49 changes the amount of current discharged or charged by the charge pump 20. Thus, while the stability in the vicinity of the normal state of the duty correction circuit can be maintained, the responsiveness on the rapid change of the amplitude of an input signal to the circuit can be improved.

Figure 11A:
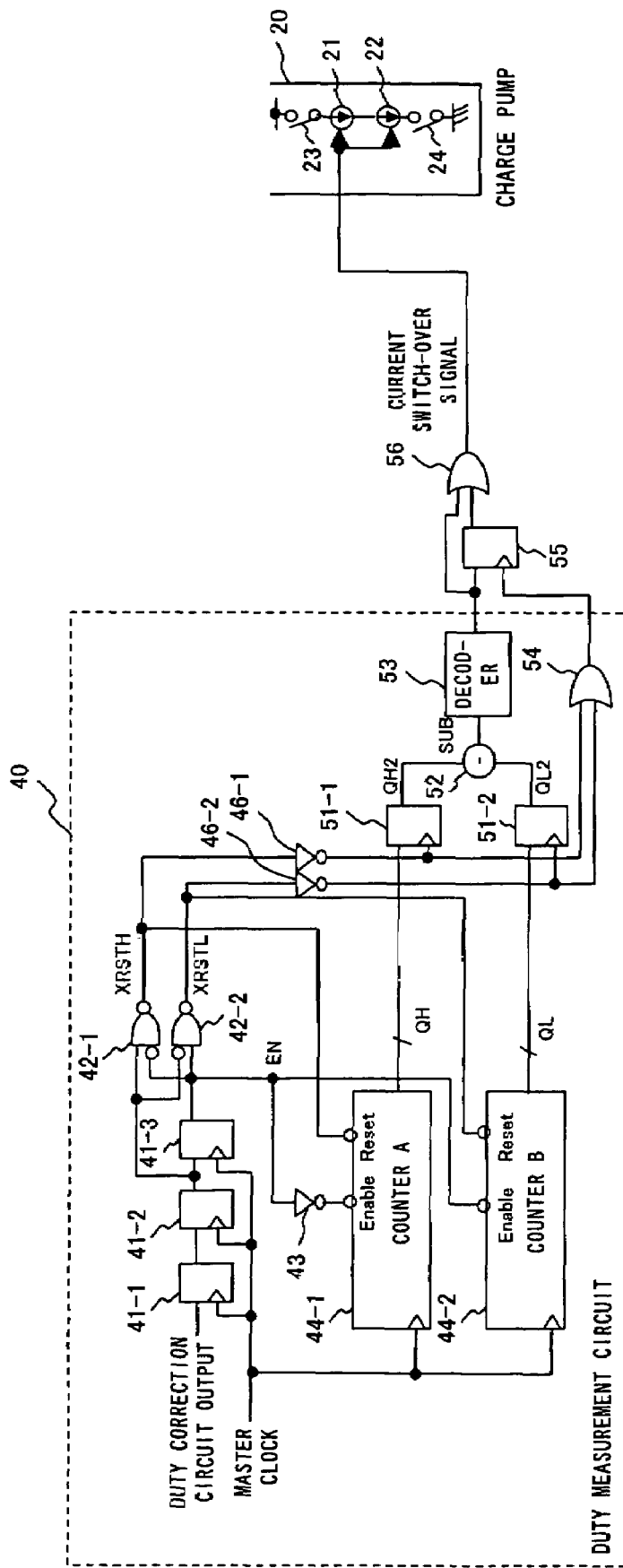
FIG. 11A shows the second example of the detailed circuit configuration of the duty correction circuit.
Figure 11B:
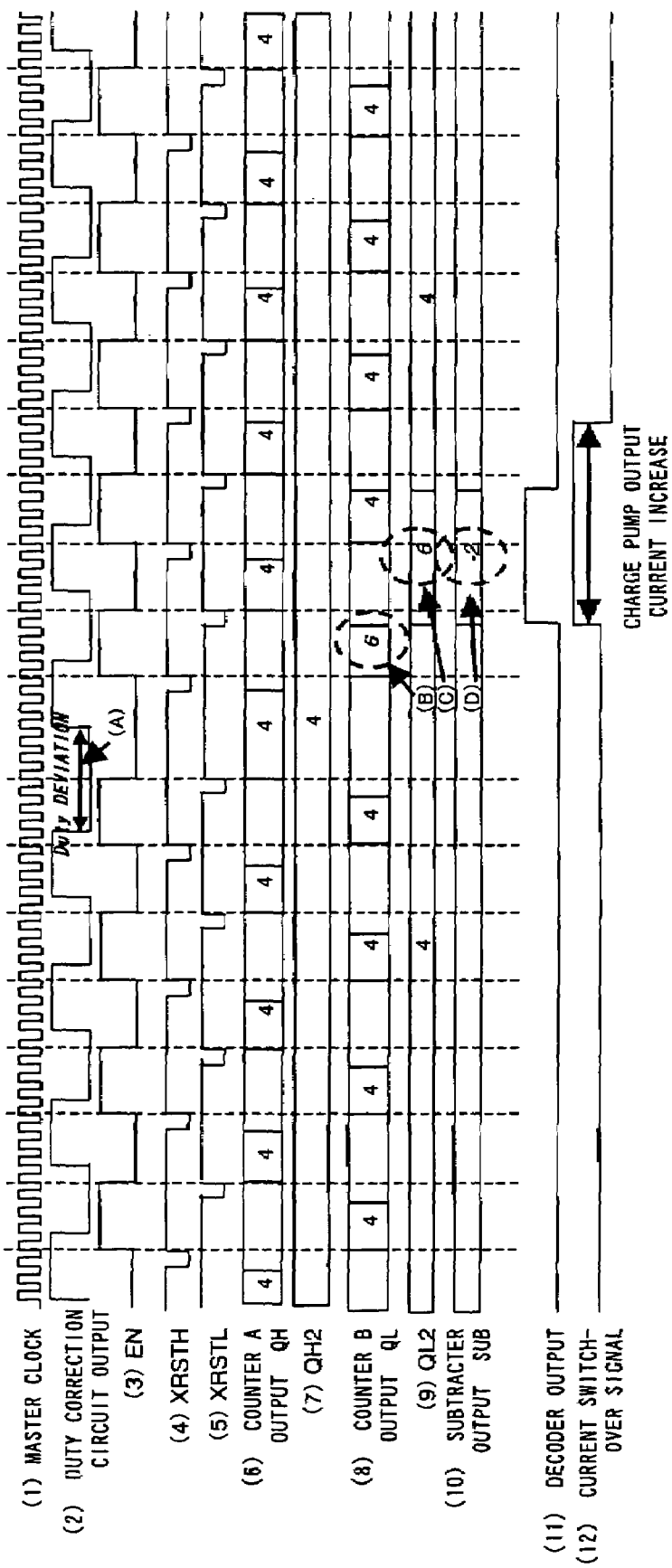
FIG. 11B shows the signal waveform of each unit of the circuit shown in FIG. 11A.

Next, FIGS. 11A and 11B are described. FIG. 11A shows the second example of the detailed circuit configuration of the duty correction circuit 40. FIG. 11B shows the signal waveform of each unit of the circuit shown in FIG. 11A.

The circuit shown in FIG. 11A has the same configuration as shown in FIG. 10A. The same reference numerals are attached to the components performing the same operations, and their detailed operational descriptions are omitted. The waveforms shown in (1) through (6) and (8) of FIG. 11B are the same as shown in FIG. 10B.

In this preferred embodiment, if the difference in continuation time between H and L signals in a digital signal (digital signal encoded by a Manchester code) outputted from the duty correction circuit exceeds two cycles of the Master clock, the output current of the charge pump 20 is increased beyond the normal level. If it is within one cycle of the master clock, the output current of the charge pump 20 is restored to the normal level. This control condition is only one example, and another condition can also be adopted.

The duty measurement circuit 40 shown in FIG. 11A comprises D flip-flops 41-1, 41-2 and 41-3, NAND circuits 42-1 and 42-2, an inverter 43, a counter A 44-1, a counter B 44-2, inverters 46-1 and 46-2, D flip-flops 51-1 and 51-2, a subtracter 52, a decoder 53, an OR circuit 54, a D flip-flop 55 and an OR circuit 56.

The signal XRSTH is inputted to the clock terminal of the D flip-flop 51-1 via the inverter 46-1. The signal XRSTL is inputted to the clock terminal of the D flip-flop 51-2 via the inverter 46-2.

The count value QH of the counter A 44-1 is inputted to the input terminal of the D flip-flop 51-1. The D flip-flop 51-1 outputs the signal inputted to the input terminal when the signal inputted to the clock terminal (signal obtained by inverting the signal XRSTH) rises up. In this case, a time needed to convey the rising change of the signal XRSTH to the D flip-flop 51-1 via the inverter 46-1 is sufficiently shorter than a time needed for the signal XRSTH to reset the count value of the counter A 44-1. Therefore, in the waveform examples shown in FIG. 11B, a value "4" immediately before the falling edge of the signal XRSTH ((4) in FIG. 11B) of the count values QH of the counter A 44-1 ((7) in FIG. 11B) arrives is outputted as the output QH2 of the D flip-flop 51-1 ((8) in FIG. 11B).

The count value QL of the counter B 44-2 is inputted to the input terminal of the D flip-flop 51-2. The D flip-flop 51-2 outputs the signal inputted to the input terminal when the signal inputted to the clock terminal (signal obtained by inverting the signal XRSTL) rises up. In the waveform examples shown in FIG. 11B, a value "4" immediately before the falling edge of the signal XRSTL ((5) in FIG. 11B) of the count values QL of the counter B 44-2 ((8) in FIG. 11B) arrives is outputted as the output QL2 of the D flip-flop 51-2 ((9) in FIG. 11B).

The subtracter 52 calculates the difference between the output QH2 of the D flip-flop 51-1 and the output QL2 of the D flip-flop 51-2 and outputs the calculation result. The decoder 53 outputs an L signal if the value of the output SUB of the subtracter 52 is "−1", "0" or "+1", and outputs an H signal if it is the other value. Thus, in FIG. 11B, if the outputs QH2 and QL2 both are "4", the difference is "0". Therefore, the output of the decoder 53 becomes an L signal.

The signal XRSTH is inputted to one input terminal of the OR circuit with two input terminals via the inverter 46-1. The signal XRSTL is inputted to the other input terminal via the inverter 46-2. The output of this OR circuit 54 is inputted to the clock terminal of the D flip-flop 55. The output of the decoder 53 is inputted to the input terminal of the D flip-flop 55. The output of the decoder 53 is inputted to one input terminal of the OR circuit with two input terminals. The output of the D flip-flop 55 is inputted to the other input terminal.

Thus, as long as the decoder 53 continues to output an L signal, the D flip-flop 55 also continues to output an L signal. In this case, the OR circuit 56 outputs an L signal. While the OR circuit 56 outputs an L signal, the charge pump 20 maintains the amount of current of the current sources 21 and 22 at a normal level.

However, in (2) of FIG. 11B, the continuation time of an L signal of the digital signal outputted from the duty correction circuit increases in the period (A). The master clock count value QL of the counter B 44-2 in this period (A) becomes "6" as shown by (B) of (8) of FIG. 11B. In this case, the output QL2 of the D flip-flop 51-2 becomes "6" as shown by (C) of (9) of FIG. 11B.

In this case, the subtracter 52 calculates the difference between the output QH2 of the D flip-flop 51-1 and the output QL2 of the D flip-flop 51-2 and outputs "−2" as the calculation result, as shown by (D) in (10) of FIG. 11B. Thus, in this case, the output of the decoder 53 becomes an H signal (see (10) of FIG. 11B).

While the output of the decoder 53 is an H signal, the OR circuit 56 outputs an H signal. The decoder 53 continues to output an H signal until the subsequent falling edge of the signal XRSTL is inputted, and then the D flip-flop 55 continues to output an H signal. Since the D flip-flop 55 continues to output an H signal until the subsequent falling edge of the signal XRSTL is inputted, the OR circuit 56 continues to output an H signal until the subsequent falling edge of the signal XRSTL is inputted. While the OR circuit 56 outputs an H signal, the charge pump 20 increases the amount of current of the current sources 21 and 22 beyond the normal level.

Thus, if the continuation time of an L signal in the digital signal outputted from the duty correction circuit increases out of the proper range, the output current of the charge pump 20 is increased to speed up the charge or discharge of the capacitors 31 and 33 of the filter 30.

In the above description, the continuation time of an L signal in the digital signal outputted from the duty correction circuit increases out of the proper range. However, if the continuation time of an L signal in the digital signal outputted from the duty correction circuit decreases below the proper amount too, the output signal of the decoder 53 becomes an H signal, and the OR circuit 56 outputs an H signal for a prescribed time. Therefore, the amount of output current of the charge pump 20 is increased beyond the normal level.

If the continuation time of an H signal in the digital signal outputted from the duty correction circuit deviates from the proper amount too, the output signal of the decoder 53 becomes an H signal, and the OR circuit 56 outputs an H signal for a prescribed time. Therefore, the amount of output current of the charge pump 20 is increased beyond the normal level.

In FIG. 11A, the counter A 44-1 and the counter B 44-2 count the number of rising edges of the master clock during the continuation time of H and L signals in the digital signal outputted from the duty correction circuit. Alternatively, the circuit configuration shown in FIG. 11A can be modified to count the number of the falling edges of the master clock. Alternatively, the respective number of both the falling and rising edges of the master clock can be counted.

As described above, in the second example of the duty measurement circuit 40 described with reference to FIGS. 11A and 11B, the counter A 44-1, the counter B 44-2 and subtracter 52 measure the difference in continuation time between H and L signals in the output of the comparator 10 of the duty correction circuit, using a master clock. Then, the decoder 53 detects whether the difference in continuation time changes beyond a prescribed time. If such a change is detected, a control signal generated by a circuit composed of the D flip-flop 55 and the OR circuit 56 changes the amount of current discharged or charged by the charge pump 20. Thus, while the stability in the vicinity of the normal state of the duty correction circuit can be maintained, the responsiveness on the rapid change of the amplitude of an input signal to the circuit can be improved.

Figure 12A:
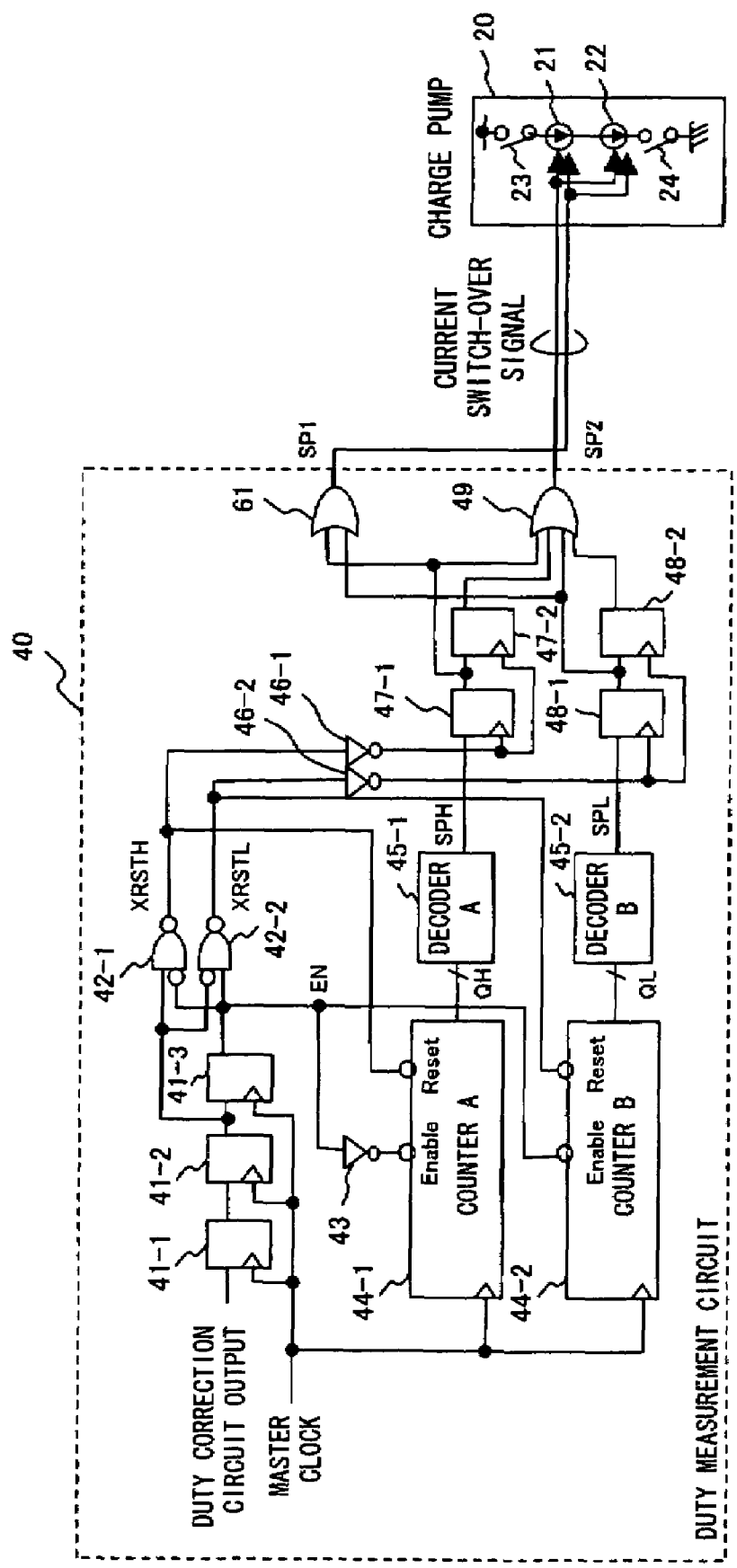
FIG. 12A shows the third example of the detailed circuit configuration of the duty correction circuit.
Figure 12B:
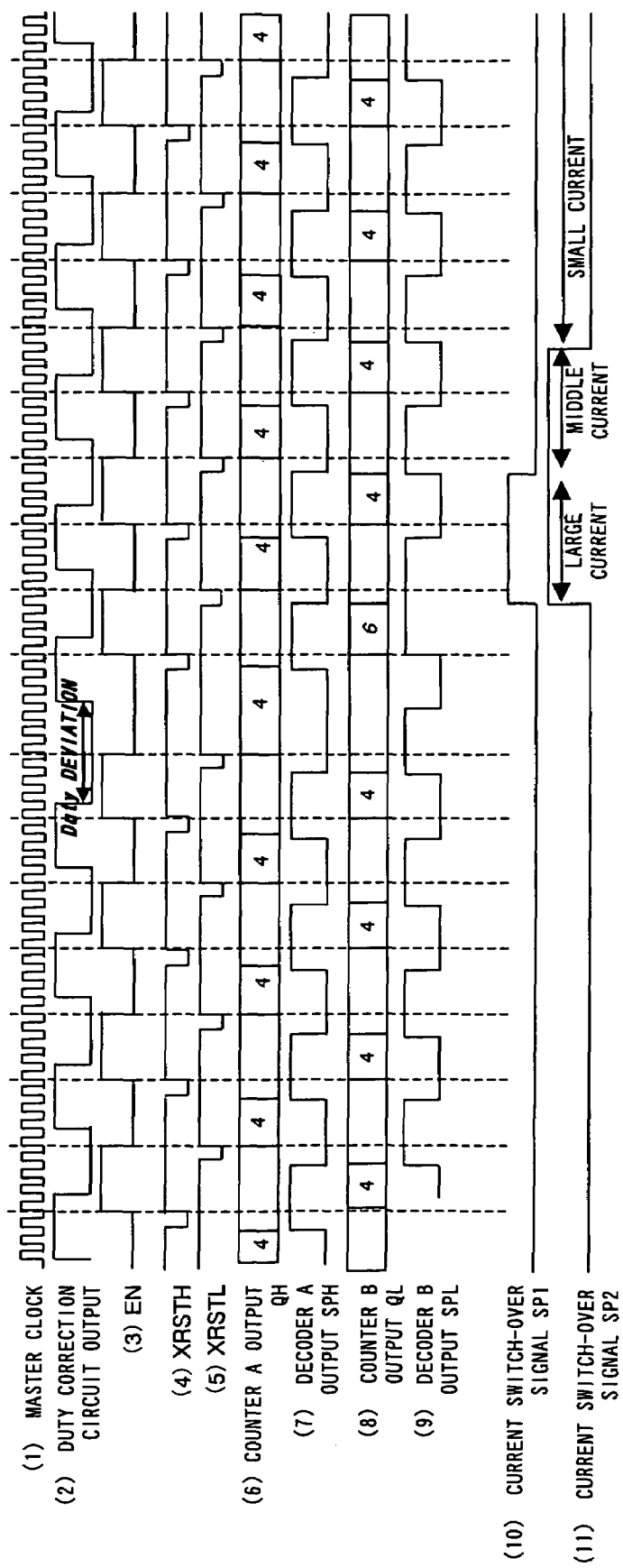
FIG. 12B shows the signal waveform of each unit of the circuit shown in FIG. 12A.

Next, FIGS. 12A and 12B are described. FIG. 12A shows the third example of the detailed circuit configuration of the duty correction circuit 40. FIG. 12B shows the signal waveform of each unit of the circuit shown in FIG. 12A.

The circuit shown in FIG. 12A has the same configuration as shown in FIG. 10A. The same reference numerals are attached to the components performing the same operations, and their detailed operational descriptions are omitted. The waveforms shown in (1) through (9) of FIG. 12B are the same as shown in FIG. 10B.

In this preferred embodiment, if the difference in continuation time between H and L signals in a digital signal (digital signal encoded by a Manchester code) outputted from the duty correction circuit exceeds two cycles of the Master clock as in the first example shown in FIG. 10A, the output current of the charge pump 20 is increased beyond the normal level. If it is within one cycle of the master clock, the output current of the charge pump 20 is restored to the normal level. However, in this preferred embodiment, the current change in the case where the output current of the charge pump 20 is restored to the normal level should be slower than the current change in the case where the output current of the charge pump 20. This control condition is only one example, and another condition can also be adopted.

The duty measurement circuit 40 shown in FIG. 12A further comprises an OR circuit 61 in addition to the circuit configuration shown in FIG. 10A. The respective outputs of the D flip-flops 47-1 and 48-1 are inputted to the two input terminals of the OR circuit 61 with two input terminals respectively.

As described above, the OR circuit 49 outputs an L signal while the D flip-flops 47-1, 47-2, 48-1 and 48-2 all output an L signal. It outputs an H signal while any of the flip-flops outputs an H signal. However, the OR circuit 61 outputs an L signal while both the D flip-flops 47-1 and 48-1 output an L signal. It outputs an H signal while either of the D flip-flops 47-1 and 48-1 outputs an H signal. Therefore, firstly while the D flip-flops 47-1, 47-2, 48-1 and 48-2 all output an L signal, that is, while the duty of the digital signal outputted from the duty correction circuit is proper, the output SP1 of the OR circuit 61 and the output SP2 of the OR circuit 49 both become L signals.

While the continuation time of an L signal in the digital signal outputted from the duty correction circuit increases out of the proper range and the D flip-flop 48-1 outputs an H signal, the output SP1 of the OR circuit 61 and the output SP2 of the OR circuit 49 both become H signals.

Then, as described above, the D flip-flop 48-1 continues to output an H signal until the subsequent falling edge of the signal XRSTL is inputted. Then, the D flip-flop 48-1 outputs an L signal, and instead, the D flip-flop 48-2 outputs an H signal. This D flip-flop 48-2 continues to output an H signal until the subsequent falling edge of the signal XRSTL is further inputted. During this period, although the output SP1 of the OR circuit becomes an L signal, the output SP2 of the OR circuit 49 continues to be an H signal.

The charge pump 20 maintains the amount of current of the current sources 21 and 22 at a normal level while the OR circuits 61 and 49 both output L signals. It increases the amount of current of the current sources 21 and 22 at a maximum level beyond the normal level while the OR circuits 61 and 49 both output H signals. It maintains the amount of current of the current sources 21 and 22 between the normal level and the maximum level (for example, in the middle) while the OR circuits 61 and 49 output L and H signals, respectively.

Thus, if the continuation time of an L signal in the digital signal outputted from the duty correction circuit increases out of the proper range, the output current of the charge pump 20 is increased up to the maximum level to immediately speed up the charge or discharge of the capacitors 31 and 33 of the filter 30. If the continuation time of an L signal in the digital signal outputted from the duty correction circuit restores to within the proper range, the output current of the charge pump 20 is gradually reduced to gradually reduce the speed of the charge or discharge of the capacitors 31 and 33 of the filter 30.

As described above, in the third example of the duty measurement circuit 40 described with reference to FIGS. 12A and 12B, the counter A 44-1 and the counter B 44-2 measure the respective continuation times of H and L signals in the output of the comparator 10 of the duty correction circuit, using a master clock. Then, the decoder A 45-2 and the decoder B 45-2 detect whether at least one of the continuation times change beyond a prescribed time. If such a change is detected, a control signal generated by a circuit composed of the D flip-flops 47-1, 47-2, 48-1 and 48-2, and the OR circuits 49 and 61 immediately increases the amount of current discharged or charged by the charge pump 20 from a stationary level to a first level to reduce a time needed to charge/discharge the capacitors 31 and 33 of the filter 30.

Then, the decoder A 45-1 and the decoder B 45-2 detect whether the continuation time restores to within a prescribed time. If such a change is detected, a control signal generated by a circuit composed of the D flip-flops 47-1, 47-2, 48-1 and 48-2 and the OR circuits 49 and 61 changes the amount of current discharged or charged by the charge pump 20 from the first level to a second level, and further gradually reduces it to the stationary level. Thus, a change to extend the time needed to charge/discharge the capacitors 31 and 33 of the filter 30 can be made slower than a change to shorten the time.

Thus, the stability of the duty correction circuit immediately after restoring the amount of output current of the charge pump 20 to the stationary level can be improved.

In the second example of the duty correction circuit of the present invention, shown in FIG. 9, the amount of current discharged or charged by the charge pump 20 is changed to change the time constant needed to charge/discharge the capacitors 31 and 33 of the filter 30. Alternatively, as in the third example of the duty correction circuit of the present invention, shown in FIG. 13, the time constant needed to charge/discharge the capacitors 31 and 33 of the filter 30 can be changed by changing the capacity of the capacitors 31 and 33 and the resistance value of the resistor 32, which constitute the filter 30.

In the third example shown in FIG. 13, the duty measurement circuit 40 measures the duty of a signal outputted from the comparator 10, that is, the digital signal outputted from the duty correction circuit. Then, the capacity of the capacitors 31 and 33 and the resistance value of the resistor 32, which constitute the filter 30 are controlled according to this measurement results to change the time constant needed to charge or discharge the capacitors 31 and 33. More specifically, if the duty ratio of the signal outputted from comparator 10 deviates from 50% out of the prescribed ratio, the capacity of the capacitors 31 and 33 and the resistance value of the resistor 32 are changed in such a way as to shorten the time constant of the filter 30. Then, the circuit shown in FIG. 13 approaches the normal state. If the duty ratio of the signal outputted from the comparator 10 is improved from 50% up to within the prescribed ratio, the capacity of the capacitors 31 and 33 and the resistance value of the resistor 32 are restored to the original values to secure the stability of the circuit shown in FIG. 13 at the normal state.

The detailed circuit configuration of the duty measurement circuit 40 shown in FIG. 13 can also be the same as shown above in FIG. 10A, 11A or 12A.

FIG. 14A shows an example of the capacitor circuit capable of switching the capacity by a switch-over signal outputted from the duty measurement circuit 40. This circuit can be obtained by connecting the connection in series between capacitors 71-1, 71-2, . . . , 71-n and switches 72-1, 72-2, . . . , 72-n in parallel. The switch-over signal outputted from the duty measurement circuit 40 switches over the switches 72-1, 72-2, . . . , 72-n, using this circuit as the capacitors 31 and 33 shown in FIG. 13.

Figure 14B:
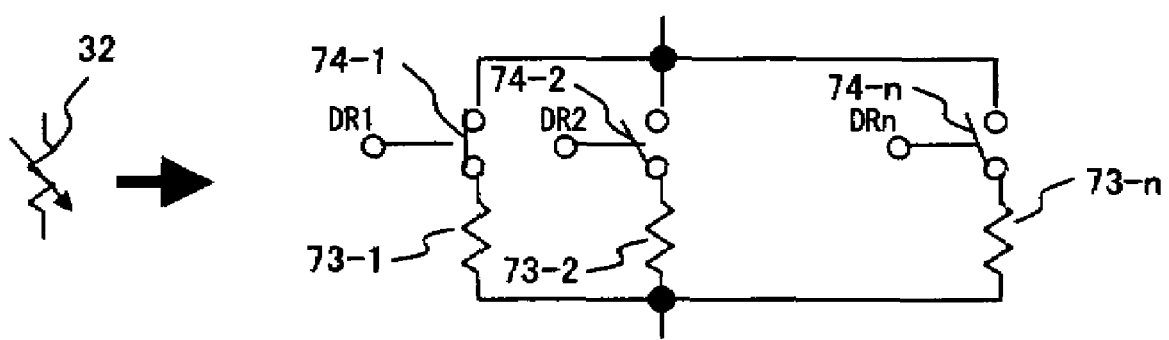
FIG. 14B shows an example of the resistor circuit capable of switching the resistance by a switch-over signal outputted from the duty measurement circuit.

FIG. 14B shows an example of the resistor circuit capable of switching the resistance by a switch-over signal outputted from the duty measurement circuit 40. This circuit can be obtained by connecting the connection in series between resistors 73-1, 73-2, . . . , 73-n and switches 74-1, 74-2, . . . , 74-n in parallel. The switch-over signal outputted from the duty measurement circuit 40 switches over the switches 74-1, 74-2, . . . , 74-n, using this circuit as the resistor 32 shown in FIG. 13.

Although so far the preferred embodiments of the present invention are described, the present invention is not limited to the above-described preferred embodiments. As long as the subject matter of the present invention is not deviated, its various improvements/modifications are possible.

What is claimed is:

1. A correction circuit for correcting a duty of a digital signal encoded by a Manchester code, comprising:
   a comparator for comparing a voltage of an envelope signal obtained by applying envelope detection to a signal whose amplitude is modulated by the digital signal with a terminal voltage of a capacitor;
   a charge pump for charging/discharging the capacitor by discharging or charging current, according to the comparison result;
   a duty measurement unit for measuring a duty of a signal outputted from the comparator; and
   a charge/discharge control unit for controlling time constant needed for the charge pump to charge/discharge the capacitor, according to the duty measurement result.

2. The correction circuit according to claim 1, further comprising
   a filter, which is comprised of the capacitor, for converting an output current of the charge pump into a voltage.

3. The correction circuit according to claim 2, wherein the filter comprises
   a first capacitor inserted between an output of the charge pump and a constant voltage source or ground;
   a resistor one terminal of which is connected to the output of the charge pump; and
   a second capacitor inserted between the other terminal of the resistor and the constant voltage source or the ground, and
   the comparator compares the voltage of the envelop signal with a terminal voltage of the second capacitor.

4. The correction circuit according to claim 2, wherein the capacitor is inserted between an output of the charge pump and a constant voltage source or ground.

5. The correction circuit according to claim 1, wherein the charge/discharge control unit controls the time constant by changing an amount of current discharged or charged by the charge pump.

6. The correction circuit according to claim 1, wherein the charge/discharge control unit controls the time constant by changing a capacity of the capacitor.

7. The correction circuit according to claim 1, wherein the duty measurement unit measures a continuation time of a high-level signal and a continuation time of a low-level signal outputted from the comparator, when at least one of the continuation times changes beyond a prescribed time, the charge/discharge control unit performs the control.

8. The correction circuit according to claim 1, wherein the duty measurement unit measures a difference in a continuation time between a high-level signal and a low-level signal outputted from the comparator, and when the difference in the continuation time changes beyond a prescribed time, the charge/discharge control unit performs the control.

9. The correction circuit according to claim 1, wherein when controlling the time constant in such a way as to extend it, the charge/discharge control unit controls the time constant slower than when controlling the time constant in such a way as to shorten it.

\* \* \* \* \*